US011245320B2

(12) United States Patent
Ling et al.

(10) Patent No.: US 11,245,320 B2
(45) Date of Patent: Feb. 8, 2022

(54) LINEAR VIBRATION MOTOR

(71) Applicant: AAC Technologies Pte. Ltd., Singapore (SG)

(72) Inventors: Fanghua Ling, Shenzhen (CN); Feng Tao, Shenzhen (CN); Xiaofeng Pu, Shenzhen (CN); Mengxun Shi, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 197 days.

(21) Appl. No.: 16/699,708

(22) Filed: Dec. 1, 2019

(65) Prior Publication Data

US 2020/0212776 A1 Jul. 2, 2020

(30) Foreign Application Priority Data

Dec. 30, 2018 (CN) .......................... 201822278808.2

(51) Int. Cl.
 *H02K 33/18* (2006.01)
(52) U.S. Cl.
 CPC .................... *H02K 33/18* (2013.01)
(58) Field of Classification Search
 CPC ........ H02K 33/12; H02K 33/14; H02K 33/16; H02K 35/02; H02K 1/34; H02K 35/00; H02K 35/04; H02K 33/18; H02K 33/00; H02K 33/02
 USPC ..................................................... 310/28, 35
 See application file for complete search history.

(56) References Cited

U.S. PATENT DOCUMENTS 6,173,895 B1 * 1/2001 Plesko ............... G06K 7/10653
235/462.33

FOREIGN PATENT DOCUMENTS

CN          106817006 A  *  6/2017
CN          107425692 A  * 12/2017

OTHER PUBLICATIONS

Ling (CN 106817006 A) English Translation (Year: 2017).*
Mao (CN 107425692 A) English Translation (Year: 2017).*

* cited by examiner

*Primary Examiner* — Tulsidas C Patel
*Assistant Examiner* — Robert E Mates
(74) *Attorney, Agent, or Firm* — W&G Law Group

(57) ABSTRACT

The present invention provides a linear vibration motor, which includes a base, a vibration unit, an elastic part and a coil assembly. The vibration unit has a weight, a pole plate and a magnet. The coil assembly includes an iron core and a coil fixed to the iron core. Further, the iron core includes an iron core body for being wound by the coil, and an iron core extension part extended and fixed from the opposite ends of the iron core body. The iron core extension part of the base includes a connecting part connected to the iron core body and a fixing part bent and extended by the connecting part and fixed to the base. A thickness of the connecting part is greater than a thickness of the fixing part. Compared with the related technology, the linear vibration motor has improved vibration performance.

5 Claims, 2 Drawing Sheets

LINEAR VIBRATION MOTOR

FIELD OF THE PRESENT DISCLOSURE

The present disclosure relates to the field of electrical transducers, more particularly to a linear vibration motor in a mobile device, for converting electrical signals into tactile feedbacks.

DESCRIPTION OF RELATED ART

With the development of electronic technology, portable consumer electronic products, such as mobile phones, handheld game consoles, navigation devices or handheld multimedia entertainment devices are more and more popular. These electronic products generally use linear vibration motors to perform system feedback, such as phone call prompt, information prompt, navigation prompt, vibration feedback of game machines, etc. Such a wide range of applications requires that the vibration motor has excellent performance and long service life.

The linear vibration motor of related technology includes a base with a receiving space, a vibration unit located in the receiving space, an elastic member fixing and suspending the vibration unit in the receiving space, and a coil assembly fixed with the base. The vibration unit includes a weight, a pole plate and a magnet. The coil assembly includes a coil and an iron core for generating a magnetic field interacting with a magnetic field generated by the magnet of the vibration unit, so as to drive the vibration unit to perform reciprocating linear motion and generate tactile feedback.

However, in the linear vibration motor of related technology, the thickness of the pole plate is substantially the same, and the thickness of the iron core is also substantially the same. The magnetic field generated by the coil is concentrated and blocked by the magnetic lines in the magnetic field existing in the pole plate and the iron core, which weakens the magnetic field strength and the vibration strength, thus affecting the vibration performance of the linear vibration motor.

Therefore, it is necessary to provide an improved linear vibration motor to solve the above-mentioned problems.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
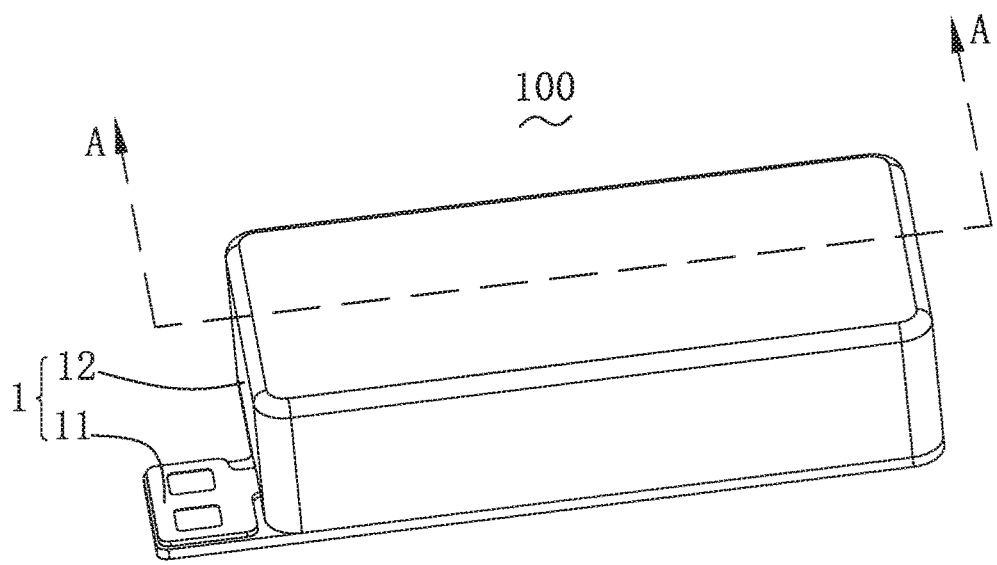
FIG. 1 is an isometric view of a linear vibration motor in accordance with an exemplary embodiment of the present disclosure.
Figure 2:
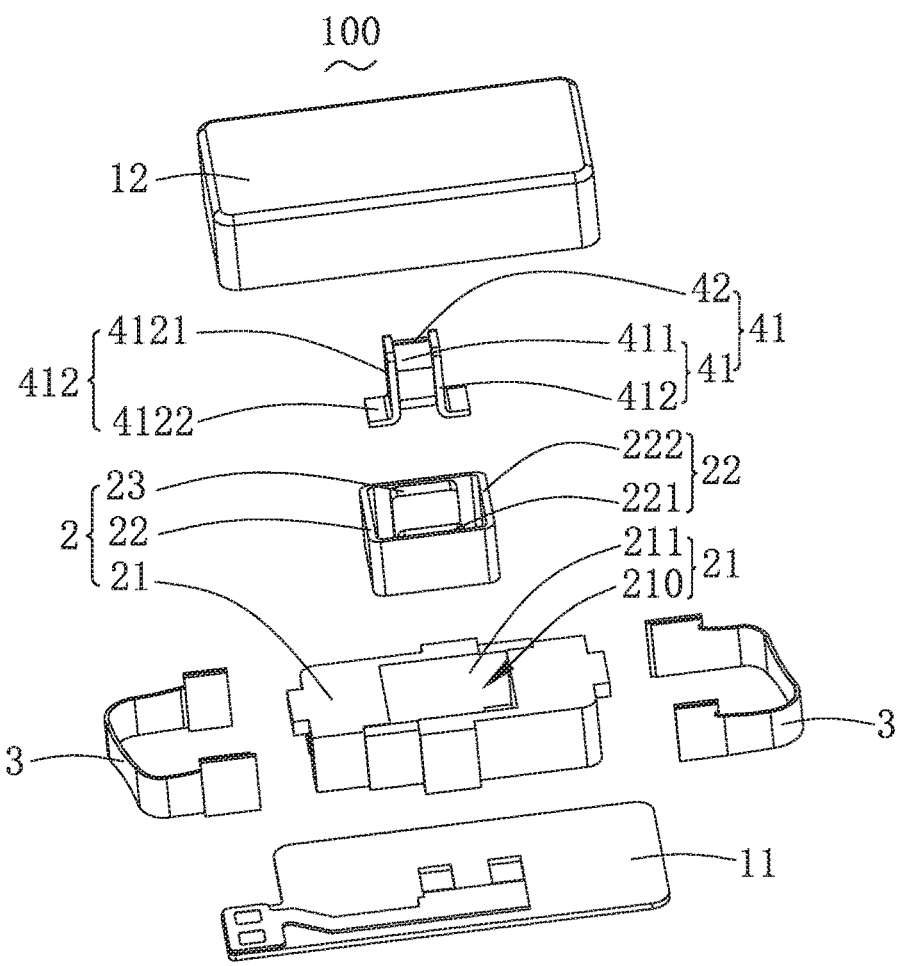
FIG. 2 is an exploded and isometric view of the linear vibration motor in FIG. 1.
Figure 3:
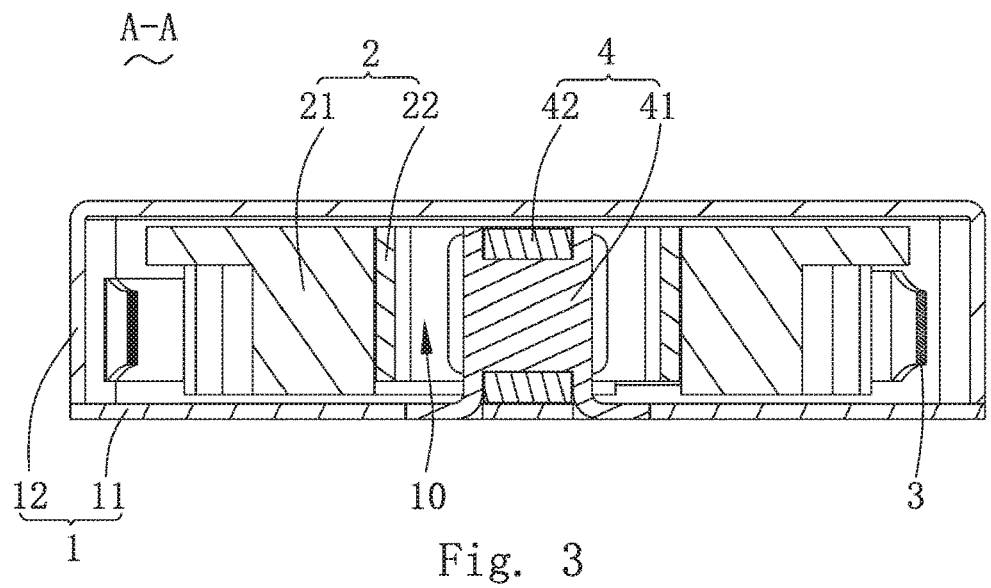
FIG. 3 is a cross-sectional view of the linear vibration motor, taken along line A-A in FIG. 1.
Figure 4:
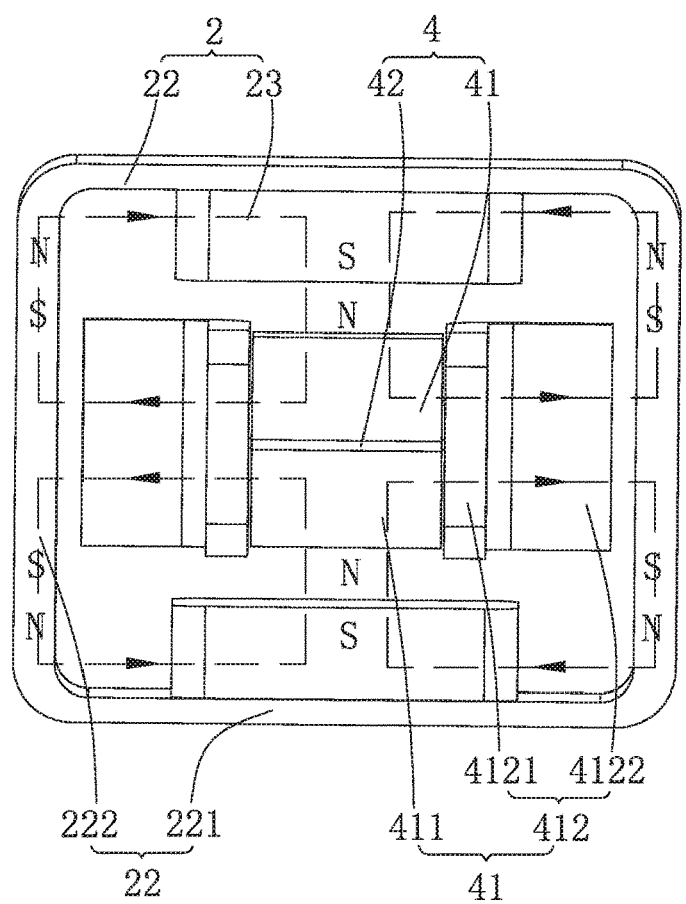
FIG. 4 is a top view of the linear vibration motor which is partially assembled.

Referring to FIGS. 1-4, a linear vibration motor 100, in accordance with an exemplary embodiment of the present disclosure is provided. The linear vibration motor 100 comprises a base 1, a vibration unit 2, an elastic member 3 and a coil assembly 4.

The base 1 has a receiving space 10, a base plate 11 and an upper cover 12 engaging with the base plate 11 for forming the receiving space 10. The vibration unit 2 is disposed in the receiving space 10. In the embodiment, the vibration unit 2 is supported and suspended in the receiving space 10 by the elastic member 3.

Specifically, the vibration unit 2 includes a weight 21, a pole plate 22 and a magnet 23. The weight 21 includes a through hole 210 bounded by a hole wall 211. The weight 21 is made of a non-magnetic conductive material.

The pole plate 22 is annular, and a positive projection thereof along a vertical vibration direction is rectangular. The shape of the pole plate 22 corresponds to the shape of the through hole 210, so that the pole plate 22 is accommodated in the through hole 210. Specifically, the pole plate 22 is fixed by the hole wall 211. The pole plate 22 includes two opposite first side walls 221 and two opposite second side walls 222. Specifically, the two first side walls 221 are arranged parallel to a long axis direction of the pole plate 22, and the two second side walls 222 are arranged parallel to a short axis direction of the pole plate 22.

The magnet 23 includes two pieces arranged on opposite sides of the pole plate 22. Anther word, two magnet 23 are fixed on opposite sides of the pole plate 22. Specifically, the two magnet 23 are respectively fixed on two first side walls 221.

The elastic member 3 suspends the vibration unit 2 in the receiving space 10. Specifically, one end of the elastic member 3 is fixed to the vibration unit 2, and the other end is fixed to the base 1. Further, the elastic member 3 is connected with the upper cover 12, that is, the elastic member 3 is fixed on the upper cover 12 of the base 1.

The coil assembly 4 is fixed on the base 1 and drives the vibration unit 2 to vibrate. The coil assembly 4 extends between the two magnets 23 and is spaced from the magnet 23.

Specifically, the coil assembly 4 includes an iron core 41 inserted in the through hole 210 and spaced with the magnet 23 and a coil 42 fixed to the iron core 41.

The iron core 41 includes an iron core body 411 for being wound by the coil 42, and an iron core extension 412 extending from opposite ends of the iron core body 411 and fixed to the base 1. The coil 42 is wound around the iron core body 411. Specifically, the iron core body 411 extends along the vibration direction. The iron core extension part 412 includes a connecting part 4121 connected to the iron core body 411, and a fixing part 4122 bent and extended from the connecting part 4121 and fixed to the base 1, In addition, the fixing part 4122 is fixed to the base plate 11.

In order to increase the magnetic flux of the iron core 41, a thickness of the connecting part 4121 is increased at a place where the magnetic lines are concentrated and blocked, that is, a thickness of the connecting part 4121 is greater than a thickness of the fixed part 4122. Specifically, the thickness of the fixing part 4122 increases gradually from an end far away from the connecting part 4121 to toward an end adjacent to the connecting part 4121. Of course, it is also possible for the thickness of the connecting part to gradually increase from the end adjacent to the fixed part to the end far away from the fixed part. Thus, the flow of the magnetic field line is expanded, the magnetic field strength is increased, and the magnetic flux is correspondingly increased by about 10%, so that the vibration performance of the linear vibration motor 100 is improved.

The coil 42 is wound around the iron core body 411 and is located between the two magnets 23. After the coil 42 is energized, the iron core 41 forms a magnetic field and interacts with the magnetic field of the magnet 23, so as to drive the vibration unit 2 to reciprocate linearly and produce a vibration effect.

Optionally, the magnetic field strength can be increased not only by increasing the thickness of the connecting part 4121 of the iron core 41. More preferably, in order to increase the magnetic flux of the pole plate 22, it is also possible to increase the thickness of the second side wall 222 at a place where the magnetic line is concentrated and blocked. That is, the thickness of the second side wall 222 is greater than the thickness of the first side wall 221. Thus, the flow of the magnetic field line is expanded, the magnetic field strength is enhanced, and the vibration performance of the linear vibration motor 100 is improved.

Compared with related technologies, the iron core extension part of the linear vibration motor of the present disclosure includes a connection part connected to the iron core body and a fixed part extending from the connection part to the base and fixed to the base. The thickness of the connection part is greater than the thickness of the fixed part. Without affecting the overall volume, the linear vibration motor can expand the flux line flow by locally increasing the iron core, improve the magnetic field strength, and correspondingly increase the flux, so as to improve the vibration performance of the linear vibration motor.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, including:
   a base with a receiving space;
   a vibration unit placed in the receiving space, including a weight with a through hole, a pole plate located in the through hole, and a magnet fixed to the pole plate;
   an elastic member suspending the vibration unit in the receiving space;
   a coil assembly fixed to the base and driving the vibration unit, including an iron core inserted in the through hole and spaced with the magnet, and a coil fixed to the iron core; wherein
   the iron core comprises an iron core body for being wound by the coil, and an iron core extension part extending from opposite ends of the iron core body and fixed to the base;
   and the iron core extension part comprises a connecting part connected with the iron core body, and a fixing part bent and extended from the connecting part and fixed on the base;
   a thickness of the connecting part is greater than a thickness of the fixing part.

2. The linear vibration motor as described in claim 1, wherein the base comprises an upper cover connected with the elastic member and a base plate engaging with the upper cover to form the receiving space, and the fixing part is fixed on the base plate.

3. The linear vibration motor as described in claim 1, wherein the weight comprises a hole wall bounding the through hole, the pole plate is annular and fixed on the hole wall.

4. The linear vibration motor as described in claim 3, wherein the magnet comprises two pieces arranged on opposite sides of the pole plate.

5. The linear vibration motor as described in claim 1, wherein the weight is made of non-magnetic conductive material.

* * * * *